United States Patent
Cervera

[15] 3,638,313
[45] Feb. 1, 1972

[54] EXTRA ORAL DENTAL RETRACTOR AND BITE OPENER

[72] Inventor: Alberto J. Cervera, Miquel Angel, 1, DPDO, Madrid, 10, Spain

[22] Filed: July 14, 1970

[21] Appl. No.: 54,729

[52] U.S. Cl. ............................................................32/14 D
[51] Int. Cl. ..............................................................A61c 7/00
[58] Field of Search......................................312/14 A, 14 D

[56] References Cited

UNITED STATES PATENTS

| | | | |
|---|---|---|---|
| 2,880,509 | 4/1959 | Strickler | 32/14 D |
| 2,983,046 | 5/1961 | Jenkins | 32/14 D |

Primary Examiner—Robert Peshock
Attorney—Richard K. MacNeill

[57] ABSTRACT

An extra oral dental retractor and bite opener having a U-shaped outer arch wire for coupling to a wearer's neckband and the U-shaped inner arch wire coupled in the center portion thereof to the center portion of the U-shaped outer arch wire; a flat bite plate coupled to the center portion of one or both U-shaped arch wires and extending rearwardly therefrom for separating the upper and lower front teeth of the wearer; an elastic band coupled across the inner U-shaped arch wire for resting on the front teeth of the wearer and having a center portion pivotally attached by a wire to the front portion of the bite plate for limiting the travel of the elastic band.

5 Claims, 2 Drawing Figures

PATENTED FEB 1 1972  3,638,313

INVENTOR.
ALBERTO J. CERVERA
BY
Richard K. Macneill

EXTRA ORAL DENTAL RETRACTOR AND BITE OPENER

BRIEF DESCRIPTION OF THE INVENTION

The present invention relates to an extra oral dental retractor and bite opener and more particularly to an extra oral dental retractor and bite opener having a bite plate and an elastic tooth band pivotally attached thereto for limiting the travel of the elastic band.

According to the invention, an extra oral dental retractor and bite opener is provided having an inner arch wire with an elastic band stretched across it as by hooks. A bite plate is provided which has a pivotal coupling to the center portion of the elastic band to limit its movement and prevent the elastic band from riding into the gum line. Hence, through the use of a bite plate, the upper and lower teeth are separated and, at the same time, an elastic tooth band is limited in travel in that it cannot reach the gum line of the wearer.

An object of the present invention is the provision of an extra oral dental retractor and bite opener having a bite plate for separating upper and lower teeth.

Another object of the present invention is the provision of an extra oral dental retractor and bite opener having an elastic tooth band with limited travel.

A further object of the invention is the provision of an extra oral dental retractor and bite opener which is inexpensive to manufacture and extremely effective in use.

Other objects and many of the attendant advantages of this invention will be readily appreciated as the same becomes better understood by reference to the following detailed description when considered in connection with the accompanying drawings in which like reference numerals designate like parts throughout the FIGS. thereof and wherein.

DETAILED DESCRIPTION OF THE DRAWINGS

Figure 1:
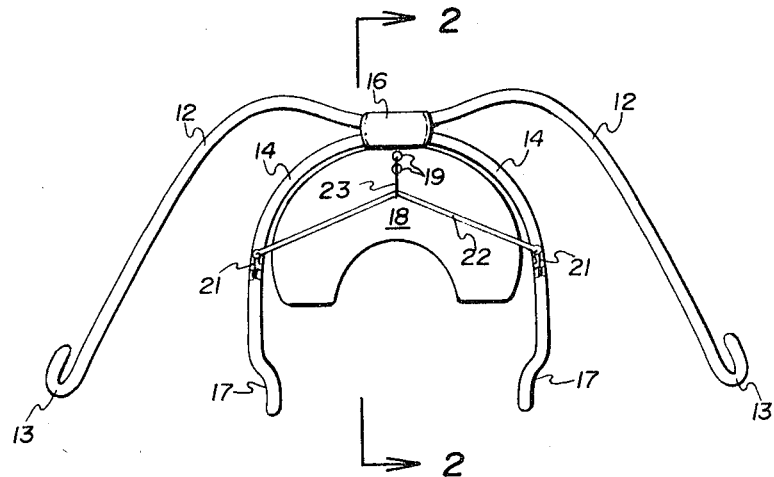
FIG. 1 is a top view of the preferred embodiment of the present invention.

Referring to FIG. 1, the extra oral dental retractor and bite opener is shown generally at 11 having an outer U-shaped arch wire 12 terminating in neck band hooks 13. An inner U-shaped arch wire 14 is coupled by coupling member 16 to outer arch wire 12 and terminates in molar stops 17. Bite plate 18 is attached to coupling member 16 and has a pair of apertures 19 therein. Inner arch wire 14 carries hooks 21 across which is stretched an elastic band 22. A wire 23 passes through apertures 19 in bite plate 18 and is attached to a center portion of elastic band 22.

Figure 2:
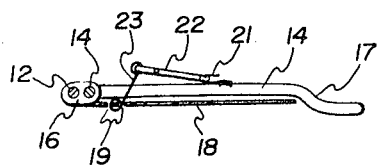
FIG. 2 is a side elevation view of the embodiment of FIG. 1.

Referring to FIG. 2, coupler 16 is shown having an outer U-shaped arch wire 12 (not shown) and an inner U-shaped arch wire 14 passed therethrough. Bite plate 18 is also coupled to coupling member 16 and has a pair of apertures 19 therein. An elastic band 22 is carried by hooks 21 attached as by soldering or welding to inner arch wire 14. A wire 23 has one end passing through apertures 19 of bite plate 18 and another end wrapping around elastic band 22.

OPERATION

Referring back to FIGS. 1 and 2, it can be seen that the wearer's upper teeth rest on the top of bite plate 18 and inner arch wire 14 surrounds the upper teeth of the wearer. Elastic band 22, which can be a plain rubber band, is stretched between hooks 21 on arch wire 14 and then attached by wire 23 to bite plate 18. This pivotal attachment through apertures 19 allows freedom of movement of elastic band 22 and, at the same time, limits its upward travel so that it cannot ride into the gum line of the wearer with attendant discomfort.

It should be understood, of course, that the foregoing disclosure relates to only a preferred embodiment of the invention and that it is intended to cover all changes and modifications of the example of the invention herein chosen for the purposes of the disclosure which do not constitute departures from the spirit and scope of the invention.

The invention claimed is:

1. An extra oral dental retractor and bite opener comprising:
   a U-shaped outer arch wire for coupling to a wearer's neckband;
   a U-shaped inner arch wire coupled in a center portion thereof to a center portion of said outer arch wire;
   a flat bite plate coupled to the center portion of one of said arch wires and extending rearwardly therefrom for separating a wearer's upper and lower front teeth; and
   an elastic tooth band coupled across said inner U-shaped arch wire for exerting pressure on the front teeth of a wearer.

2. The extra oral dental retractor and bite opener of claim 1 and further including:
   first and second hooks carried by said inner arch wire, said elastic band being stitched between said first and second hooks.

3. The extra oral dental retractor and bite opener of claim 1 wherein:
   said elastic band is coupled at a center portion thereof to said bite plate for limiting the travel thereof.

4. The extra oral dental retractor and bite opener of claim 1 and further including:
   a pivotal coupling means, said pivotal coupling means coupling a center portion of said elastic band to said bite plate.

5. The extra oral dental retractor and bite opener of claim 4 wherein;
   said pivotal coupling means comprises a wire looped around said elastic band at one end thereof and looped through first and second apertures in said bite plate at another end thereof.

* * * * *